F. H. SLEEPER.
MACHINE FOR MAKING COILED SPRINGS.
APPLICATION FILED MAY 27, 1907.

940,828.   Patented Nov. 23, 1909.
6 SHEETS—SHEET 1.

Witnesses
R.D.Tolman
Penelope Cruberbach

Inventor
Frank H. Sleeper.
By Rufus B. Fowler
Attorney

F. H. SLEEPER.
MACHINE FOR MAKING COILED SPRINGS.
APPLICATION FILED MAY 27, 1907.

940,828.

Patented Nov. 23, 1909.
6 SHEETS—SHEET 5.

Witnesses
A. D. Tolman.
Penelope Cumberbatch.

Inventor
Frank H. Sleeper.
By Rufus B. Fowler
Attorney

F. H. SLEEPER.
MACHINE FOR MAKING COILED SPRINGS.
APPLICATION FILED MAY 27, 1907.

940,828.

Patented Nov. 23, 1909.
6 SHEETS—SHEET 6.

Witnesses
R. D. Tolman.
Penelope Cumberbach.

Inventor
Frank H. Sleeper.
By Rufus B. Fowler
Attorney

UNITED STATES PATENT OFFICE.

FRANK HENRY SLEEPER, OF COATICOOK, QUEBEC, CANADA, ASSIGNOR TO MORGAN SPRING COMPANY, OF WORCESTER, MASSACHUSETTS, A CORPORATION OF MASSACHUSETTS.

MACHINE FOR MAKING COILED SPRINGS.

940,828.   Specification of Letters Patent.   Patented Nov. 23, 1909.

Application filed May 27, 1907.   Serial No. 375,796.

*To all whom it may concern:*

Be it known that I, FRANK HENRY SLEEPER, a citizen of Canada, residing at Coaticook, in the county of Stanstead and Province of Quebec, Canada, have invented a new and useful Improvement in a Machine for Making Coiled Springs, of which the following is a specification, accompanied by drawings forming a part of the same, in which—

Figure 1:
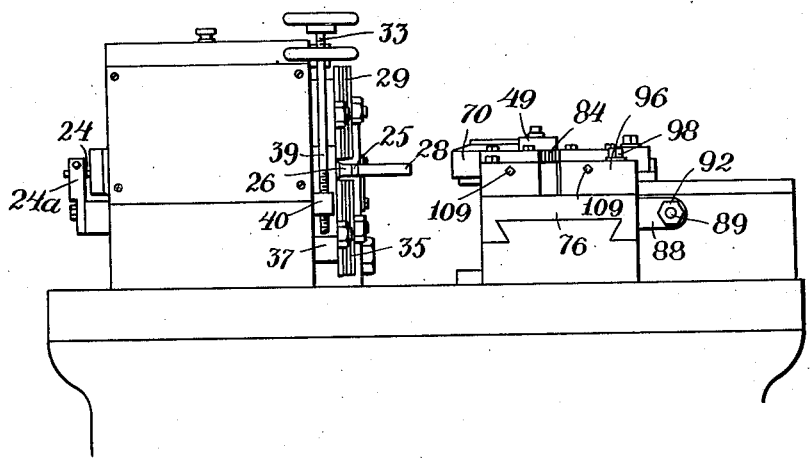
Figure 2:
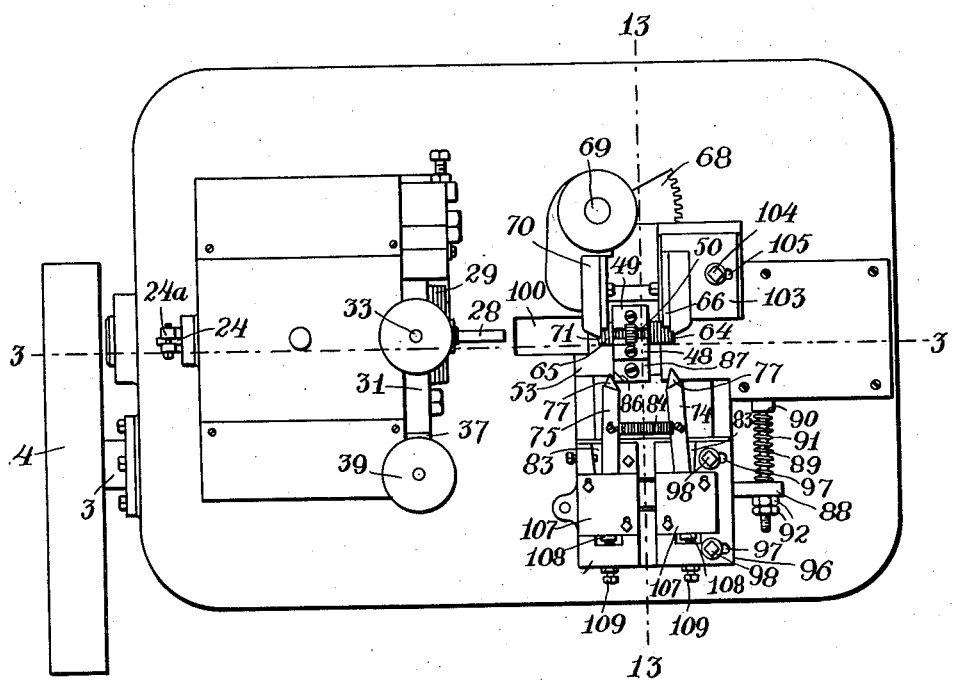
Figure 3:
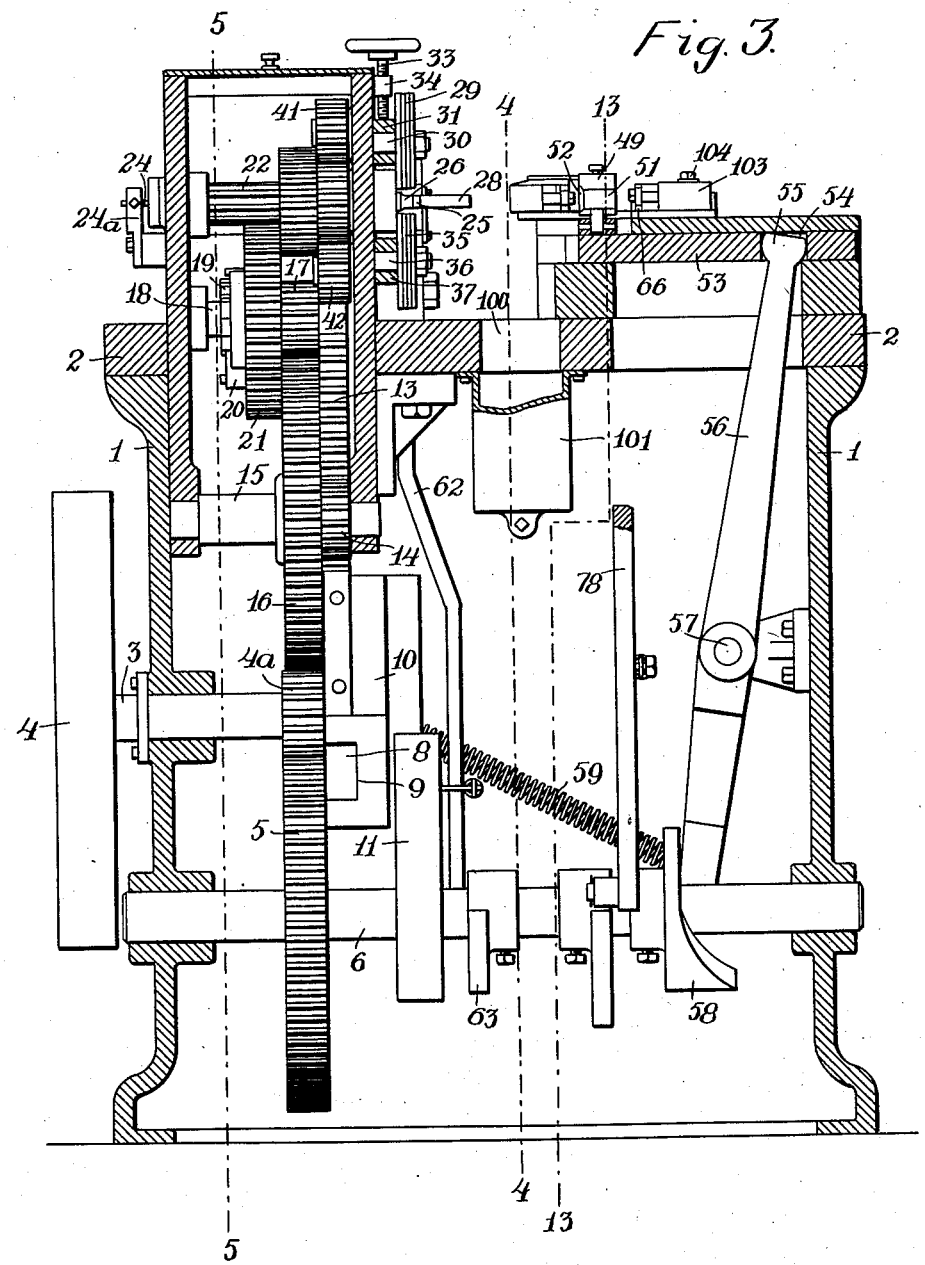
Figure 4:
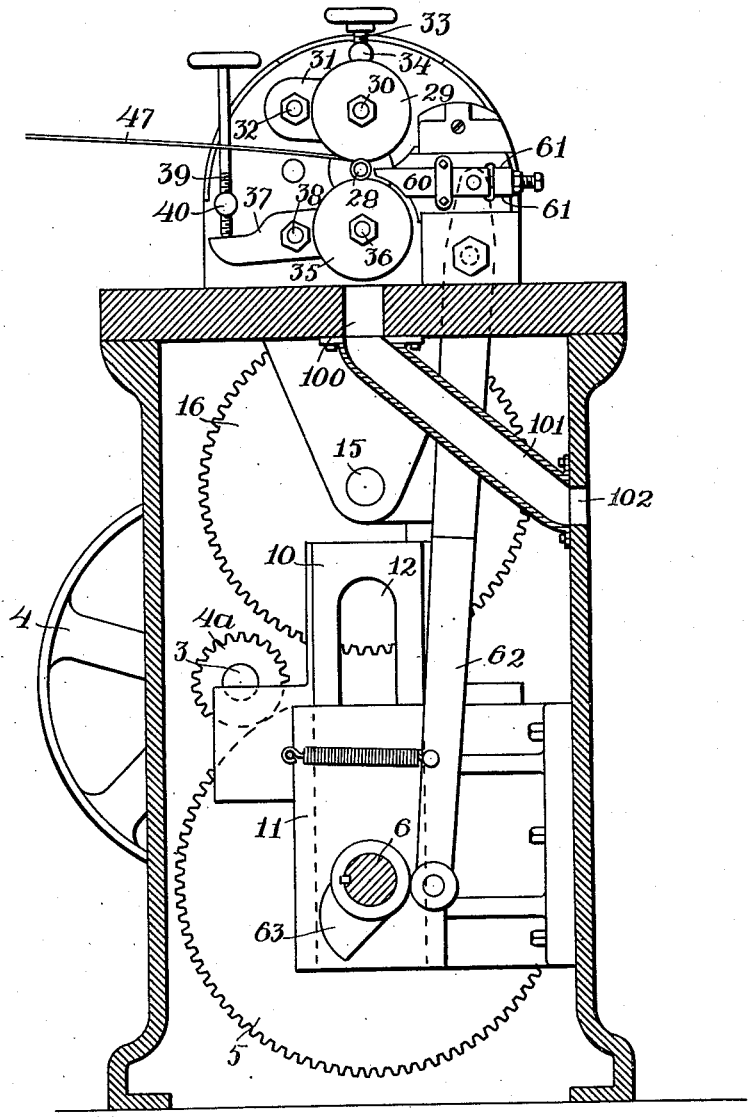
Figure 5:
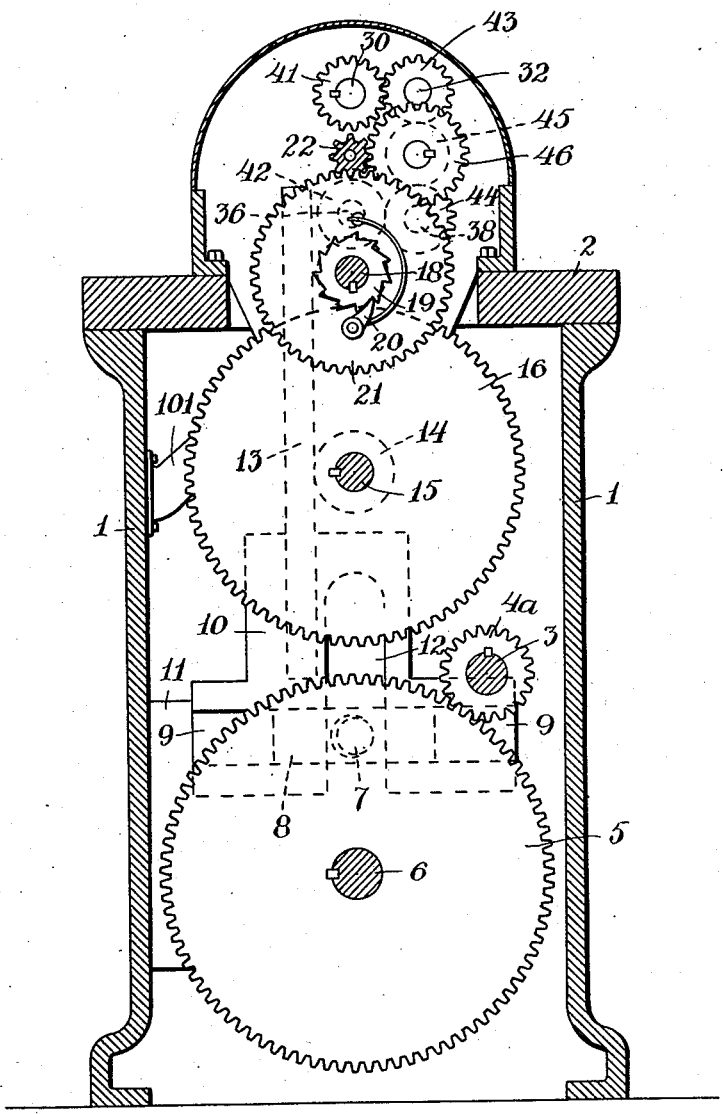
Figure 6:
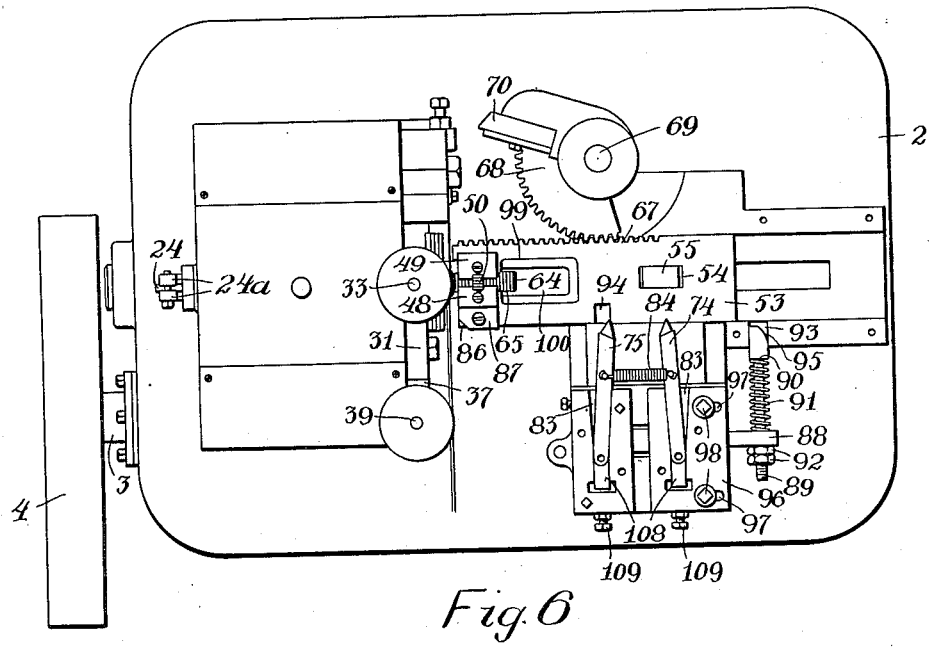
Figures 7, 8:
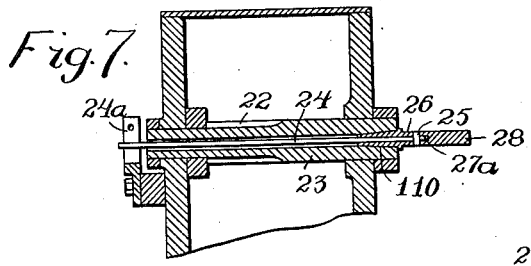
Figure 11:
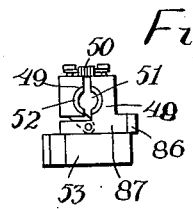
Figure 9:
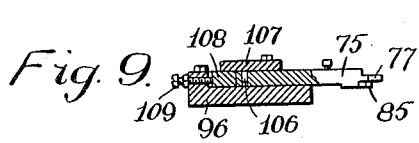
Figure 10:
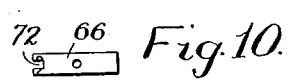
Figure 12:
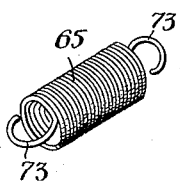
Figure 13:
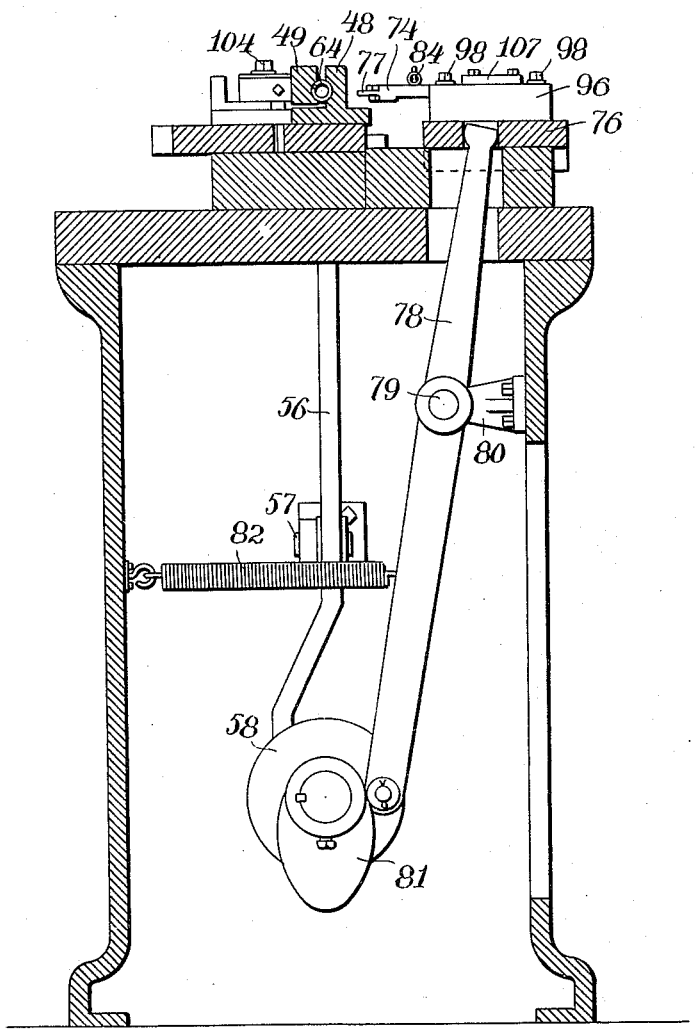

Figure 1 is a side elevation of the upper part of the machine, showing the coiling and the hook forming mechanism. Fig. 2 is a plan view of the machine. Fig. 3 is a vertical sectional view on the plane of the broken line 3—3, Fig. 2. Fig. 4 is a vertical sectional view on the plane of the broken line 4—4, Fig. 3. Fig. 5 is a vertical sectional view on the plane of the broken line 5—5, Fig. 3. Fig. 6 is a plan view of the machine with certain parts removed in order to disclose the hook forming mechanism. Fig. 7 is a vertical sectional view through the coiling arbor. Fig. 8 is an elevation of the spring clamping mechanism. Fig. 9 is a detached and partly sectional view of one of the hook formers. Fig. 10 is a detached view of one of the fulcrum blocks over which the end coil of the spring is bent to form a hook or loop, and Fig. 11 is an enlarged end view of the cutting section of the coiling arbor. Fig. 12 is a perspective view of a coiled wire spring having hooks or loops formed on its ends and representing the completed product of my improved machine, and Fig. 13 is a vertical sectional view on line 13—13, Figs. 2 and 3.

Similar reference characters refer to similar parts in the different views.

My improved machine is especially designed for manufacturing that class of coiled wire springs which are provided with a hook or loop at their ends, and it consists in the construction and arrangement of parts as hereinafter described and pointed out in the annexed claims.

The machine forming the subject of my present invention comprises instrumentalities for, first, coiling the wire upon an arbor to form the spring; second, gripping the coiled spring; third, severing the wire to enable the coiled spring to be removed from the arbor by an endwise movement; fourth, transferring the coiled spring from the arbor to hook forming mechanism; fifth, forming hooks or loops on the ends of the spring.

Referring to the accompanying drawings 1 denotes a supporting framework, preferably consisting of a shell or case which incloses certain parts of the operative mechanism, and supports a table 2, upon which are mounted those parts of the mechanism which are directly concerned in coiling the spring and forming hooks thereon. Journaled in the framework is a shaft 3, carrying at one end a belt pulley 4 and at its opposite end a pinion 4$^a$ which is in mesh with a gear wheel 5 attached to a cam shaft 6. The gear wheel also carries a crank pin 7 engaging a plate 8, capable of sliding in horizontal ways 9 in a vertically sliding plate 10 moving in ways formed in a fixed plate 11 attached to the framework of the machine. The vertically sliding plate is provided with a slot 12 open at one end, which allows the plate 10 to slide past the cam shaft 6 as the crank pin 7 is rotated. The short plate 8, as the crank pin 7 rotates around the cam shaft, slides from one end to the other of the horizontal ways 9 and makes a complete revolution around the cam shaft 6. Attached to the vertically sliding plate 10 is a rack bar 13, engaging a pinion 14 on a short shaft 15, which carries a gear wheel 16, engaging a pinion 17, which is attached to a shaft 18 carrying a ratchet wheel 19. The ratchet wheel 19 engages a pawl 20 carried by a gear wheel 21 which turns loosely on the shaft 18 and engages the gear teeth 22 on a wire coiling arbor 23.

By the up and down motion of the rack bar 13 a reciprocating motion is imparted to the shaft 18 which, through the pawl and ratchet mechanism, imparts an intermittent rotary motion in one direction to the wire coiling arbor 23. The wire coiling arbor 23 is hollow and incloses a spindle 24 which is held at one end in a fixed position by a clamp 24$^a$ attached to the framework of the machine. The opposite end of the spindle 24 is provided with a collar 25 of the same diameter as the wire coiling section 26 of the arbor 23. The wire coiling section 26 is held in the hollow arbor 23 with sufficient friction to overcome the pull of the wire, and is arranged to revolve loosely about the spindle 24.

The collar 25 has a recess on one side to form a radial shoulder 27 which constitutes one member of the cutting mechanism for severing the coiled wire. The spindle 24 is also provided with a screw threaded tip 27ᵃ to receive a cylindrical extension 28 of the same diameter as the collar 25 which serves as a support for the spring as it is coiled and pushed off the rotating section of the arbor 23. Placed above the arbor 23 is a grooved bending roll 29 attached to a spindle 30, which is journaled in an arm 31 capable of swinging on a fixed stud 32. An adjusting screw 33, held in a fixed stud 34, projecting from the framework, bears against the swinging arm 31 to crowd the grooved bending roll 29 toward the arbor. A similar grooved bending roll 35 is placed below the arbor and is carried on a spindle 36, journaled in an arm 37, capable of swinging on a fixed stud 38 projecting from the frame of the machine and adjusted by a screw 39 held in a fixed stud 40, in order to crowd the bending roll 35 toward the arbor. The spindles of the bending rolls carry pinions 41 and 42 in mesh with pinions 43 and 44 respectively. The pinion 43 is concentric with the pivotal stud 32 of the swinging arm 31, and the pinion 44 is concentric with the pivotal stud 38 of the swinging arm 37, and these pinions 43 and 44 are connected by gears 45 and 46 with the gear teeth 22 on the wire coiling arbor 23, causing the grooved bending rolls 29 and 35 to be positively rotated synchronously with the arbor 23.

The wire 47, to be coiled, is taken from a reel, not shown, and conducted between the arbor and the bending rolls 29 and 35. The wire is crowded closely against the arbor by the lower bending roll 35, and the upper bending roll 29 is pressed against the wire to regulate the distance between the wire and the arbor, as it is desired to coil the spring more or less tightly on the arbor, thereby allowing for more or less variation in the diameter of the coiled spring. The arbor 23 is rotated intermittently as already described and when a spring has been coiled and the rotation of the arbor ceases, a spring gripping mechanism is advanced to seize the coiled spring as it is held on the stationary extension 28 of the arbor.

The gripping mechanism consists of a pair of jaws 48 and 49, the latter jaw 49 being pivoted and drawn toward the jaw 48 by a spring 50. The space 51, between the jaws, is normally slightly smaller than the diameter of the coiled spring except at its receiving end, which is flared at 52 to enable the spring to enter and force the jaws apart, and cause it to be securely clamped between the jaws by the tension of the spring 50. The gripping jaws 48 and 49 are carried on a sliding plate 53 which is mortised at 54 to receive the upper end 55 of a lever 56, pivoted at 57, and having its lower end actuated to advance the gripping jaws toward the spring by a side cam 58. When the lever is released by the cam 58 it is reversed and the gripping jaws retracted by a spiral spring 59.

As soon as the coiled spring has been seized by the gripping jaws 48 and 49, a sliding cutter 60 arranged to engage the shoulder 27 on the collar 25 is advanced in transverse ways 61, 61, by means of a pivoted lever 62 which is actuated by a cam 63, causing the cutter 60 to coöperate with the radial shoulder 27 on the collar 25, and to shear the wire interposed between the cutter 60 and the shoulder 27, thereby severing the coiled spring held on the stationary extension 28 from the coils on the rotating section 26 of the arbor, and allowing it to be removed by the reverse movement of the gripping jaws 48 and 49.

The reverse movement of the gripping jaws carries the advancing end 64 of the coiled spring 65 against a stop plate 66, and any further movement of the gripping mechanism causes the spring 65 to slide within the jaws 48 and 49. The sliding plate 53 is provided on one edge with rack teeth 67 which engage a toothed sector 68, pivoted on a stud 69 held in the table 2. The sector 68 carries a radial arm 70 which is arranged, on the reverse movement of the plate 53, to be brought against the rear end 71 of the coiled spring 65, causing the coiled spring 65 to be firmly gripped between the stop plate 66 and the radial arm 70. The stop plate 66, which is shown detached in Fig. 10, is provided with a recess 72 to inclose the end of the coiled spring 65, and the radial arm 70 is similarly provided with a like recess to receive the opposite end of the coiled spring 65. The tips of the stop plate 66 and of the radial arm 70 form fulcrums over which the end coils of the wire spring are bent to form hooks or loops by the hook forming mechanisms, which at this period in the operation of the machine are brought into action to simultaneously turn up the end coils of wire at each end of the coiled spring 65 to form the hooks 73, 73, Fig. 12.

The hook forming mechanism comprises two steel bars 74 and 75 held in a reciprocating carriage 76 and having their forward ends 77 beveled and adapted to enter the space between the end coils and the next adjacent coil at each end of the coiled spring, and to crowd the end coils outward, bending them over the ends of the stop plate 66 and radial arm 70, thereby forming hooks or loops 73, 73, upon the ends of the coiled spring.

The reciprocating carriage 76 is advanced toward the coiled spring 65 by a lever 78 pivoted at 79 upon a bracket 80, projecting from the frame of the machine and actuated by a cam 81, the reverse movement being accomplished by a spring 82 connecting the lever 78 with the framework. The bars 74 and 75 are pivotally held at their rear ends in slots 83 in the carriage 76 within which they are capable of a slight angular movement, and are drawn toward each other against the inner sides of the slots 83 by means of a spring 84. In this position the bar 74 is in proper alinement with the advancing end of the coiled spring as it rests against the stop plate 66 and is in position, when the bar is moved forward, to force its beveled end between the end coil and the next adjacent coil of the spring and bend it over the end of the stop plate 66. The bar 75 is provided on its under side with a beveled shoulder 85 which, as the bar 75 moves forward, contacts with the beveled end 86 of a plate 87 carried by the plate 53, thereby causing the bar 75 to swing on its pivotal connection with its carriage, and to move its beveled end laterally to bring it in alinement with the space between the end coil and the adjacent coil of the spring.

The beveled plate 87 is adjustably attached to the plate 53 so its position may be varied in order to adjust the bar 75 to any slight variation in the length of the spring. Hooks or loops having been formed on the ends of the springs by turning the end coils of the spring outward, the bars 74 and 75 are withdrawn by a reverse movement of the carriage 76. The reciprocating carriage 76 is provided on one side with an arm 88 which loosely incloses a locking bolt 89. Between the arm 88 and a shoulder 90 on the locking bolt, is interposed a spiral spring 91, and the outer end of the bolt 89 is screw threaded and provided with nuts 92. The inner end of the locking bolt slides in a slot 93 in the framework, and is pressed against the edge of the sliding plate 53 by the tension of the spiral spring 91 as the arm 88 is moved forward. The sliding plate 53 is provided on its edge with a notch 94 into which the end of the locking bolt 89 enters when the sliding plate 53 has reached the limit of its reverse movement, thereby locking the plate 53 and gripping jaws firmly in position and preventing any movement of the latter during the formation of hooks or loops on the ends of the coiled spring. The locking bolt 89 is beveled at 95 to allow for any slight variation in the length of the coiled spring 65. The carriage 76 which supports the hook forming mechanism comprises an adjustable plate 96 carrying the bar 74 and capable of lateral adjustment by means of slots 97 and bolts 98, thereby enabling the bar 74 to be laterally adjusted to secure its proper alinement with the end coil of the spring 65. During the formation of the hooks or loops 73, 73, on the ends of the spring and the withdrawal of the hook forming mechanism, rotary motion is imparted to the arbor 23 and a second spring is wound. The gripping jaws 48 and 49 are then moved forward carrying their inclosed spring 65 against the end of the extension 28, causing the completed spring to be pushed endwise from between the gripping jaws and allowed to fall through an opening 99 in the plate 53 and an opening 100 in the table 2, and be deflected by a curved chute 101 through an opening 102 in the side of the framework and delivered into any suitable receptacle.

The stop plate 66 is attached to a plate 103 which is adjustably attached to a fixed portion of the machine by a bolt 104 passing through a slot 105 in the plate 103, in order to enable the stop plate to be adjusted in position to receive the end of the coiled spring. The steel bars 74 and 75 by which the hooks 73, 73, are formed, are pivoted on pins 106 held in cover plates 107 which are adjustable in order to vary the position of the hook forming bars 74 and 75, and the pivotal pins 106 are relieved of the end thrust of the bars 74 and 75 by a thrust block 108 held against the end of each bar by a set screw 109. After the coiling of the wire 47 has begun, the operation of coiling successive springs by the intermittent rotation of the arbor 23 is carried on automatically and each spring as it is coiled, and during the period of rest of the arbor, is automatically severed and removed from the stationary extension to the hook forming mechanism which simultaneously forms the hooks 73, 73, on the opposite ends of the coiled spring.

During the operation of the hook forming mechanism a second spring is coiled on the arbor and as the gripping jaws advance to seize the second spring, the first spring is pushed from between the jaws and is delivered by gravity through the opening 99.

The coiling section 26 on which the wire is coiled is provided with a tapering shank 110 which is frictionally held in the hollow arbor 23, and when springs of different diameters are wound, the spindle 24, coiling section 26, and extension 28 can be removed and others of different sizes substituted.

I claim.

1. The combination of a mandrel to receive a coiled spring, means for moving the spring from said mandrel to a hook-forming mechanism, means for holding said spring stationary in a predetermined position, and a hook-forming mechanism arranged to operate upon the spring while held in said position.

2. The combination of a mandrel to receive a coiled spring, means for gripping the spring, said gripping means arranged to move said spring longitudinally from said mandrel, means for arresting the movement of said spring in a predetermined position, and a hook-forming mechanism arranged to operate upon the spring while it is held in said position.

3. In a machine of the class described, the combination of means for coiling a spring from a continuous piece of wire, means for gripping the exterior of the spring, means for severing the spring from the wire, means for presenting the severed spring to a hook-forming mechanism, comprising reciprocating gripping jaws, and a pair of plates abutting the ends of the spring, and mechanism for forming a hook from the end coil of the wire.

4. In a machine of the class described, the combination of means for coiling a spring from a continuous piece of wire, means for gripping the exterior of the spring, means for severing the spring from the wire, means for presenting the spring to a hook-forming mechanism, means for forming a hook from the end coil of wire, and means for the automatic adjustment of the hook-forming mechanism according to the length of the spring.

5. The combination of a mandrel to receive a coiled spring, reciprocating gripping means for moving said spring from said mandrel and holding it before a hook-forming mechanism, and a hook-forming mechanism, with said mandrel arranged to force the spring from said gripping means upon its return movement.

6. The combination of a mandrel to receive a coiled spring, means for placing a coiled spring upon said mandrel, severing means for freeing the spring upon said mandrel, a reciprocating carrier for transferring said coiled spring from said mandrel to hook-forming mechanism, and hook-forming mechanism, with said mandrel arranged to free said spring from said carrier upon its return movement.

7. The combination of a mandrel to receive a coiled spring, a reciprocating carrier for moving the spring from said mandrel to a predetermined position, means for holding said spring and carrier in said position, a reciprocating hook-forming mechanism, and means on said carrier for directing the movement of said hook-forming mechanism relatively to said spring.

8. The combination of a mandrel to receive a coiled spring, a reciprocating carrier for moving the spring from said mandrel, a hook-forming mechanism, and means on said hook-forming mechanism for arresting the movement of said carrier in a predetermined position.

9. In a machine of the class described, the combination of means for coiling a spring from a continuous piece of wire, and comprising a rotating arbor, means for imparting an intermittent rotary motion to said arbor, means for gripping the exterior of the spring while the arbor is at rest, and means for severing the spring from the wire.

10. In a machine of the class described, the combination of an arbor, means for imparting an intermittent rotary motion to said arbor, a pair of yielding gripping jaws for seizing the spring of the arbor, means for severing the spring from the wire, and means for imparting a reciprocating movement to said jaws, whereby the severed spring is removed from the arbor.

11. In a machine of the class described, the combination with a rotating arbor, of a reciprocating rack-bar, means for reciprocating said rack-bar, and a pawl and ratchet connection between said reciprocating rack-bar and said arbor, whereby said arbor is rotated by movement of said rack-bar in one direction.

12. In a machine of the class described, the combination with a rotating arbor for coiling a spring from a continuous wire, of means for imparting an intermittent rotary motion to said arbor, a radial shoulder on said arbor, forming a cutting surface, and a reciprocating cutter coöperating with said shoulder to sever the spring from the piece of wire.

13. In a machine of the class described, the combination with a rotating arbor, and means for rotating said arbor, of a stationary extension of the same diameter as said arbor, a radial shoulder on said extension forming a cutting surface, and a reciprocating cutter arranged to engage said shoulder, thereby severing the spring on said extension from the wire on said arbor.

14. In a machine of the class described, the combination with a rotating arbor for coiling a spring from a continuous piece of wire, of means for actuating said arbor with alternate periods of movement and rest, bending rolls, means for adjusting said bending rolls relatively to said arbor, a pair of gripping jaws, means for moving said jaws over the end of the spring, means for severing the spring from the piece of wire, and means for reversing the movement of said jaws to remove the spring from the arbor.

15. In a machine of the class described, the combination with an arbor for coiling a spring from a continuous piece of wire, of means for imparting an intermittent rotary motion to said arbor, a collar carried by said arbor and provided with a radial cutting surface inclosed within the coils of the spring, a reciprocating cutter coöperating with said cutting surface, and means for actuating said cutter during the period of rest of said arbor.

16. In a machine of the class described, the combination with an arbor for coiling a spring from a continuous piece of wire, of means for imparting an intermittent rotary motion to said arbor, a spindle held in said arbor and provided with a radial cutting surface, a reciprocating cutter coöperating with said cutting surface, and means for actuating said cutter during the period of rest of said arbor.

17. In a machine of the class described, the combination of a rotating arbor for coiling a spring from a continuous piece of wire, means for imparting an intermittent motion to said arbor, a removable member carried by said arbor and provided with a cutting surface, a reciprocating cutter coöperating with said cutting surface to sever the spring from the wire, and means for actuating said cutter during the period of rest of said arbor.

18. In a machine of the class described, the combination with a wire spring coiling mechanism, of a stationary extension to receive the spring from said coiling mechanism, and means for severing the spring on said stationary extension from the wire on said arbor.

19. In a machine of the class described, the combination with a wire spring coiling mechanism, comprising a rotary arbor, of a cutting surface carried by said arbor, a cutter coöperating with said cutting surface to sever the spring from the wire, and means for periodically actuating said cutter.

20. In a machine of the class described, the combination with a wire spring coiling mechanism comprising a rotating arbor and a stationary extension to receive the coiled spring therefrom, of a cutting mechanism for severing the spring from the wire and comprising two cutting members with one of said members carried on said stationary extension, and means for removing the severed spring from said stationary extension.

21. In a machine of the class described, the combination of a pair of gripping jaws for holding the spring with a yielding pressure, means for imparting a reciprocating motion to said jaws, and a stop plate for limiting the movement of a spring held by said jaws.

22. In a machine of the class described, the combination with holding jaws for holding a coiled spring, of a pair of plates abutting the ends of a spring held in said jaws, and provided with recesses inclosing the end coils of the spring, and means for outwardly bending the end coils of the spring against the recessed ends of said plates.

23. In a machine of the class described, the combination with means for holding a coiled spring between its ends, of plates abutting the ends of the spring, and a pair of reciprocating bars provided with beveled tips adapted to crowd the end coils of the spring outward, and means for actuating said bars.

24. In a machine of the class described, the combination with a coiling mechanism, comprising an arbor, of a pair of yielding gripping jaws, means for imparting a reciprocating movement to said jaws in a line parallel with the axis of the arbor, means for severing the spring, a stop plate in the path of the advancing end of the spring as it is carried by said jaws, a swinging plate in the plane of the spring, and means for swinging said plate against the rear end of the spring.

25. In a machine of the class described, the combination with a rotating arbor, of an extension carried by said arbor, a pair of yielding gripping jaws, means for imparting a reciprocating motion to said jaws, whereby they are carried back and forth over said extension, whereby a spring is removed from said extension, and means for forming hooks from the end coils of the spring, said extension lying in the path of said hooks, whereby the spring is pushed from said jaws.

Dated this ninth day of May 1907.

FRANK HENRY SLEEPER.

Witnesses:
PENELOPE COMBERBACH,
RUFUS B. FOWLES.